(12) United States Patent
Coleman et al.

(10) Patent No.: US 11,731,075 B2
(45) Date of Patent: Aug. 22, 2023

(54) HIGH RECOVERY PROCESS FOR PURIFICATION OF MULTICOMPONENT GASES

(71) Applicants: Luke J. Coleman, Williamsville, NY (US); Garrett R. Swindlehurst, Saint Paul, MN (US); Katie Held, Hamburg, NY (US); Kihyung Kim, Atlanta, GA (US); Werner Leitmayr, Neuburg an der Donau (DE)

(72) Inventors: Luke J. Coleman, Williamsville, NY (US); Garrett R. Swindlehurst, Saint Paul, MN (US); Katie Held, Hamburg, NY (US); Kihyung Kim, Atlanta, GA (US); Werner Leitmayr, Neuburg an der Donau (DE)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 211 days.

(21) Appl. No.: 17/085,335

(22) Filed: Oct. 30, 2020

(65) Prior Publication Data
US 2022/0040626 A1  Feb. 10, 2022

Related U.S. Application Data

(60) Provisional application No. 63/063,679, filed on Aug. 10, 2020.

(51) Int. Cl.
*B01D 53/047* (2006.01)
*B01D 53/26* (2006.01)
(Continued)

(52) U.S. Cl.
CPC ............ *B01D 53/047* (2013.01); *C10K 1/005* (2013.01); *C10K 1/32* (2013.01); *C10L 3/104* (2013.01);
(Continued)

(58) Field of Classification Search
CPC ...... B01D 53/02; B01D 53/04; B01D 53/047; B01D 53/261; B01D 2253/104;
(Continued)

(56) References Cited

U.S. PATENT DOCUMENTS 3,564,816 A    2/1971  Batta
4,077,779 A    3/1978  Sircar et al.
(Continued)

*Primary Examiner* — Frank M Lawrence, Jr.
(74) *Attorney, Agent, or Firm* — Iurie A. Schwartz

(57) ABSTRACT

The process of the present invention provides high recovery and low capital cost giving it an economic advantage over previously known purification processes. The present process has particular applicability to the purification of synthesis gases comprising at least hydrogen ($H_2$), carbon monoxide (CO), methane ($CH_4$), $CO_2$, and $H_2O$ to obtain a gas stream including at least $H_2$, CO, and $CH_4$, that is substantially free of $H_2O$ and $CO_2$. The process also has applicability to the purification of natural gases inclusive of at least $CH_4$, $N_2$, $CO_2$, and $H_2O$ to produce a gas stream including at least $CH_4$ and $N_2$, but which is substantially free of $H_2O$ and $CO_2$.

15 Claims, 8 Drawing Sheets

(51) Int. Cl.
*C10L 3/10* (2006.01)
*C10K 1/32* (2006.01)
*C10K 1/00* (2006.01)

(52) U.S. Cl.
CPC ........ *C10L 3/106* (2013.01); *B01D 2253/104* (2013.01); *B01D 2253/106* (2013.01); *B01D 2253/25* (2013.01); *B01D 2256/10* (2013.01); *B01D 2256/16* (2013.01); *B01D 2256/20* (2013.01); *B01D 2256/245* (2013.01); *B01D 2257/504* (2013.01); *B01D 2257/80* (2013.01); *B01D 2259/402* (2013.01); *B01D 2259/403* (2013.01); *B01D 2259/40013* (2013.01); *B01D 2259/40033* (2013.01); *B01D 2259/40039* (2013.01); *B01D 2259/40041* (2013.01); *B01D 2259/40052* (2013.01); *B01D 2259/40056* (2013.01); *C10L 2290/542* (2013.01)

(58) Field of Classification Search
CPC .......... B01D 2253/106; B01D 2253/25; B01D 2256/10; B01D 2256/16; B01D 2256/20; B01D 2256/245; B01D 2257/504; B01D 2257/80; B01D 2259/40013; B01D 2259/40033; B01D 2259/40039; B01D 2259/40041; B01D 2259/40052; B01D 2259/40045; B01D 2259/40075; B01D 2259/402; B01D 2259/403; B01D 2259/4062; B01D 2259/4068; C01B 3/56; C10K 1/004; C10K 1/32; C10L 3/104; C10L 3/106; C10L 2290/542; Y02C 20/40; Y02P 20/151
USPC ....... 95/96, 97, 98, 103, 104, 117–119, 121, 95/122, 139; 423/230
See application file for complete search history.

(56) References Cited

U.S. PATENT DOCUMENTS

| | | |
|---|---|---|
| 4,171,206 A | 10/1979 | Sircar |
| 4,461,630 A | 7/1984 | Cassidy et al. |
| 4,732,596 A | 3/1988 | Nicholas et al. |
| 4,752,311 A * | 6/1988 | MacLean ............... F25J 3/0285 95/143 |
| 4,836,833 A | 6/1989 | Nicholas et al. |
| 4,857,083 A | 8/1989 | DiMartino |
| 4,915,711 A | 4/1990 | Kumar |
| 5,073,356 A | 12/1991 | Guro et al. |
| 5,232,474 A | 8/1993 | Jain |
| 5,917,136 A | 6/1999 | Gaffney et al. |
| 5,931,022 A * | 8/1999 | Deng ............... B01D 53/047 62/643 |
| 6,328,945 B1 | 12/2001 | Hutton et al. |
| 7,066,984 B2 | 6/2006 | Dunn |
| 8,268,044 B2 | 9/2012 | Wright et al. |
| 8,435,328 B2 | 5/2013 | Baksh et al. |
| 2002/0134234 A1 | 9/2002 | Kalbassi et al. |
| 2004/0011198 A1 | 1/2004 | Keefer et al. |
| 2004/0118279 A1 | 6/2004 | Kalbassi et al. |
| 2005/0098034 A1 * | 5/2005 | Gittleman ................. C01B 3/56 96/121 |
| 2006/0254425 A1 * | 11/2006 | Baksh ................ B01J 20/28052 96/132 |
| 2011/0185896 A1 * | 8/2011 | Sethna .................... C10L 3/104 95/98 |
| 2012/0012000 A1 | 1/2012 | Wright et al. |
| 2018/0264432 A1 * | 9/2018 | Lau .................... B01J 20/28061 |
| 2019/0224612 A1 * | 7/2019 | Russell .................. C10G 35/22 |
| 2022/0057137 A1 * | 2/2022 | Celik ...................... B01J 23/72 |

* cited by examiner

HIGH RECOVERY PROCESS FOR PURIFICATION OF MULTICOMPONENT GASES

RELATED APPLICATION

The present application claims priority from U.S. Application Ser. No. 63/063,679, filed Aug. 10, 2020, which is incorporated by reference herein in its entirety.

FIELD OF THE INVENTION

The present invention is related to a pressure swing adsorption (PSA) process for the substantial removal of water ($H_2O$) and carbon dioxide ($CO_2$) from a multicomponent feed gas to obtain a multicomponent product gas substantially free of $H_2O$ and $CO_2$ with high recovery of the product gas. The process of the present invention provides high recovery and low capital cost giving it an economic advantage over previously known purification processes. The present process has particular applicability to the purification of synthesis gases comprising at least hydrogen ($H_2$), carbon monoxide (CO), methane ($CH_4$), $CO_2$, and $H_2O$ to obtain a gas stream including at least $H_2$, CO, and $CH_4$, that is substantially free of $H_2O$ and $CO_2$. The process also has applicability to the purification of natural gases inclusive of at least $CH_4$, $N_2$, $CO_2$, and $H_2O$ to produce a gas stream including at least $CH_4$ and $N_2$, but which is substantially free of $H_2O$ and $CO_2$. As herein utilized, it will be understood that natural gas includes, methane, ethane, propane, butane and higher hydrocarbons.

BACKGROUND OF THE INVENTION

Cryogenic separation or liquefaction of multicomponent gases, for example synthesis gases (syngas) defined herein as a mixture inclusive of at least $H_2$, CO, $CH_4$, $CO_2$ and $H_2O$, or natural gases (NG) defined herein as a mixture comprised of at least $CH_4$, $N_2$, $CO_2$ and $H_2O$, into purified products such as high-purity $H_2$ and CO or liquified NG requires the removal of substantially all $H_2O$ and $CO_2$ from the multicomponent gas. Failure to adequately remove $H_2O$ and $CO_2$, as well as other species that form solids at sub-ambient temperatures can lead to fouling and plugging of the heat exchange and separation equipment that make up the cryogenic separation and liquefaction unit. This ultimately leads to ineffective heat transfer and an increase in the pressure drop resulting in poor separation/liquefaction unit performance. The formation and accumulation of solids in the cryogenic unit is commonly known to the skilled artisan as "freeze-up" and represents both an operational and safety risk. This solid contamination usually precipitates a shutdown of the entire process to "thaw" the cryogenic unit and purge it of the contaminant species. Much of the complexity in a cryogenic separation/liquefaction process is associated with the purification of the multicomponent feed gas to remove $H_2O$ and $CO_2$ to trace levels to avoid freeze-up.

The related art provides numerous examples of conventional CO purification processes including U.S. Pat. Nos. 4,732,596, 6,328,945 B1, and 7,066,984 B2 to Nicholas, Hufton and Dunn respectively that feature the cryogenic separation of syngas into at least purified CO. In the conventional CO purification processes, raw syngas is purified to effectively remove substantially all $CO_2$ and $H_2O$ prior to being cryogenically separated. Bulk removal of $CO_2$ is achieved via a $CO_2$ scrubbing unit utilizing an aqueous solution of monoethanolamine (MEA), methyldiethylamine (MDEA), or activated MDEA to reduce the $CO_2$ concentration from percent (%) levels to parts per million (ppm) levels. The treated syngas typically exits the $CO_2$ scrubbing unit saturated with water at a temperature of about 305 to 325 K and at a pressure of between about 10 bara and about 50 bara. To reduce the water content, the treated syngas can optionally be cooled to between 275 and 305 K, preferably 277 to 289 K, with liquid water being separated from the cooled, treated syngas in a gas-liquid separator prior to being further processed in a temperature-swing adsorption (TSA) process unit. The TSA process unit utilizes solid adsorbents (e.g., alumina, silica gel, molecular sieves including 3A, 4A, and 13×, alkali-promoted alumina, which may be loaded in layers) to effectively remove substantially all $H_2O$ and $CO_2$ from the treated syngas. For all intents and purposes, $H_2O$ and $CO_2$ are removed to levels below the detection limit of most conventional analyzers. Practically speaking, $H_2O$ is typically removed to below 10 parts per billion (ppb), preferably less than 1 ppb, and $CO_2$ is typically removed to below 100 ppb, preferably less than 25 ppb. The TSA process unit, commonly referred to as a syngas dryer, plays the critical role of purifying the treated syngas to effectively eliminate $H_2O$ and $CO_2$ and other species that form solids at cryogenic temperatures. The purified syngas exits the TSA unit substantially free of $H_2O$ and $CO_2$ and is subsequently fed to a cryogenic separation unit resulting in the production of at least a purified CO product.

Such conventional process schemes that utilize multiple process units for the sequential removal of $H_2O$ and $CO_2$ from the syngas mixture are effective, but expensive. Meaningful reduction in the cost of the process in terms of the initial capital investment can only be realized with the integration and/or elimination of process units without negatively affecting the scale or complexity of the remaining process units. One approach to reducing complexity and initial capital cost of the integrated process is to replace the conventional purification process units with a single, pressure swing adsorption (PSA) process unit that performs the role of the purification units—the effective removal of substantially all $H_2O$ and $CO_2$ from syngas. Such PSA purification units have been described in the related art.

U.S. Pat. No. 4,732,596 to Nicholas et al. discloses an integrated flowsheet for the individual recovery of $H_2$ and CO each at high recovery incorporating a PSA system for the substantial removal of $H_2O$ and $CO_2$ from a syngas stream. In an exemplary embodiment, the PSA system produces a syngas stream substantially free of $H_2O$ and $CO_2$ with $H_2$, CO, and $CH_4$ recoveries of 95%, 95% and 95%, respectively. Further, an exemplary 6-column PSA process to obtain a syngas product gas that is substantially free of $H_2O$ and $CO_2$ is described, however, a suitable adsorbent is not taught and recovery of the syngas components in this exemplary PSA system are not provided. The need for and benefit of such a PSA process in terms of flowsheet simplification and significant savings in both capital and energy is demonstrated but a PSA system including adsorbent selection that is necessary in the PSA process to achieve the required performance—simultaneous removal of essentially all $H_2O$ and $CO_2$ while achieving high recovery (or low losses) of the other components of the multicomponent gas—for the process to be economically advantageous is not disclosed.

U.S. Pat. No. 4,836,833 to Nicholas et al. discloses an integrated flowsheet for the production of high-purity $H_2$ and CO incorporating a PSA system for the near complete removal of $CO_2$ from a syngas stream. Nicholas teaches that the removal of $CO_2$ may be performed using any known PSA system designed for selective removal of $CO_2$ from syngases and provided U.S. Pat. Nos. 4,077,779 and 4,171,206 as preferred PSA systems. The process described by Nicholas does not include a cryogenic separation unit for the recovery of purified $H_2$ and CO from a syngas stream and therefore the disclosed PSA system does not removal substantially all $CO_2$. In all exemplary embodiments, the PSA process removals only 99% of the contained $CO_2$ and thus the syngas product contains significant quantities of $CO_2$, in excess of 1000 ppm, v. Further, recovery of all syngas components including $H_2$, CO, and $CH_4$ was 100%. Again, the need for and benefit of such a PSA process in terms of flowsheet simplification and significant savings in both capital and energy is demonstrated but a PSA system including PSA cycle and adsorbent selection necessary for the process to realize the necessary separation performance such the economic advantage can be realized is not disclosed.

U.S. Pat. No. 5,073,356 to Guro et al. discloses an integrated process for the individual recovery of CO and $H_2$ incorporating a PSA system for the near complete removal of $CO_2$ from a syngas stream. The PSA system is disclosed as being any PSA system including vacuum swing adsorption (VSA) systems suitable for $CO_2$ removal and provide U.S. Pat. Nos. 3,564,816 and 4,915,711 as typical PSA and VSA systems suitable for use in the process of Guro et al.

U.S. Pat. No. 8,268,044 B2 to Wright et al. discloses a method for separating a feed stream comprising at least $H_2S$, $CO_2$, CO, and $H_2$ incorporating a $H_2$/CO-PSA system for the production of a $H_2$/CO stream. The $H_2$/CO-PSA system provides various degrees of $CO_2$ rejection. For example, the $H_2$/CO product stream may comprise at most 25% of the $CO_2$ present in feed gas but most preferably be substantially free of $CO_2$. Although several examplary $H_2$/CO-PSA systems are described, the $H_2$/CO-PSA system is described as being operated using any of a variety of different PSA cycles, as will be well known to those of ordinary skill in the art.

These related art documents demonstrate the need for a PSA system capable of substantially removing $H_2O$ and $CO_2$ from multicomponent gas mixtures, for example syngases or natural gases, with high recovery of the multicomponent product gas components. A number of PSA systems were cited as suitable for this application:

U.S. Pat. No. 4,077,779 to Sircar et al. describes a method of separating a $H_2$-containing gas to produce $H_2$, a single component product gas, at a purity of >99% as the primary (high pressure) product gas and $CO_2$ and/or admixtures of $CO_2$ and $CH_4$ as the secondary (low pressure) product gas. The disclosed process is purported to simultaneously produce high-purity $H_2$ and a higher purity secondary gas than the conventional processes of the time. The disclosed PSA process is not suitable for application to the process of the present invention as it does not recover a multicomponent primary (high pressure) product gas nor does it remove substantially all $CO_2$.

U.S. Pat. No. 4,171,206 to Sircar discloses an adsorptive separation process for the separation of a multicomponent feed gas into three key components—high-purity $H_2$ as the primary (high-pressure) component, purified $CO_2$ as the secondary (low pressure) component, and a tertiary component (low pressure) consisting of at least one gas from the group of CO, $CH_4$, or $N_2$. The disclosed PSA process is not suitable for application to the process of the present invention as it does not recover a multicomponent primary (high pressure) product gas nor does it remove substantially all $CO_2$.

U.S. Pat. No. 4,857,083 to DiMartino discloses a method of separating a multicomponent feed gas, preferably a $CH_4$-rich gas, to produce a high-purity primary product gas, typically $CH_4$, at high pressure and a secondary, low-pressure product gas, typically $CO_2$, also at high purity. The disclosed PSA process is not suitable for application to the process of the present invention as it does not recover a multicomponent primary (high pressure) product gas nor does it remove substantially all $CO_2$.

The PSA processes described in the related art are generally related to separating a multicomponent feed gas, typically a syngas or a natural gas, to recover a high-purity single component gas, either $H_2$ or $CH_4$, as the primary product gas and at least one secondary, low-pressure, product gas, typically enriched in $CO_2$. As such, there remains a need for a PSA process including adsorbent layering and PSA cycle that can produce, as the unadsorbed product, a multicomponent product gas, for example a syngas comprising at least $H_2$, CO and $CH_4$, that is substantially free of $H_2O$ and $CO_2$ with high recovery of the product gas components.

SUMMARY OF THE INVENTION

The present invention provides a cyclic pressure swing adsorption (PSA) process for the substantial removal of $H_2O$ and $CO_2$ including: contacting a multicomponent feed gas at elevated pressure with an adsorbent bed to obtain a multicomponent product gas substantially free of $H_2O$ and $CO_2$ with high recovery of the product gas components, the process wherein a plurality of adsorbent beds in a pressure swing adsorption system are subjected to a series of process steps which include an adsorption step, three or more pressure equalization steps at decreasing pressure, a blowdown step, a purge step in which the purge gas includes a portion of the product gas or a gas originating externally from the process that is substantially free of $H_2O$ and $CO_2$ and comprises at least one of the major components of the product gas, three or more pressure equalization steps at increasing pressure, and a final repressurization step, wherein each of the adsorbent beds contains at least one adsorbent layer for the substantial removal of $CO_2$ characterized by:

i. a $CO_2$ loading capacity of greater than or equal to 0.1 mol $CO_2$ per kg of adsorbent at a $CO_2$ partial pressure of 1000 Pa at 300 K, and ii. a differential capacity of the product gas components of less than or equal to 0.1 mol per kg of adsorbent, where the differential capacity is defined as the difference between the loading capacity at partial pressures of 100,000 Pa and 10,000 Pa at 300 K.

BRIEF DESCRIPTION OF THE FIGURES

The above and other aspects, features and advantages of the present invention will be more apparent from the following figures, wherein.

DETAILED DESCRIPTION OF THE INVENTION

Figure 1:
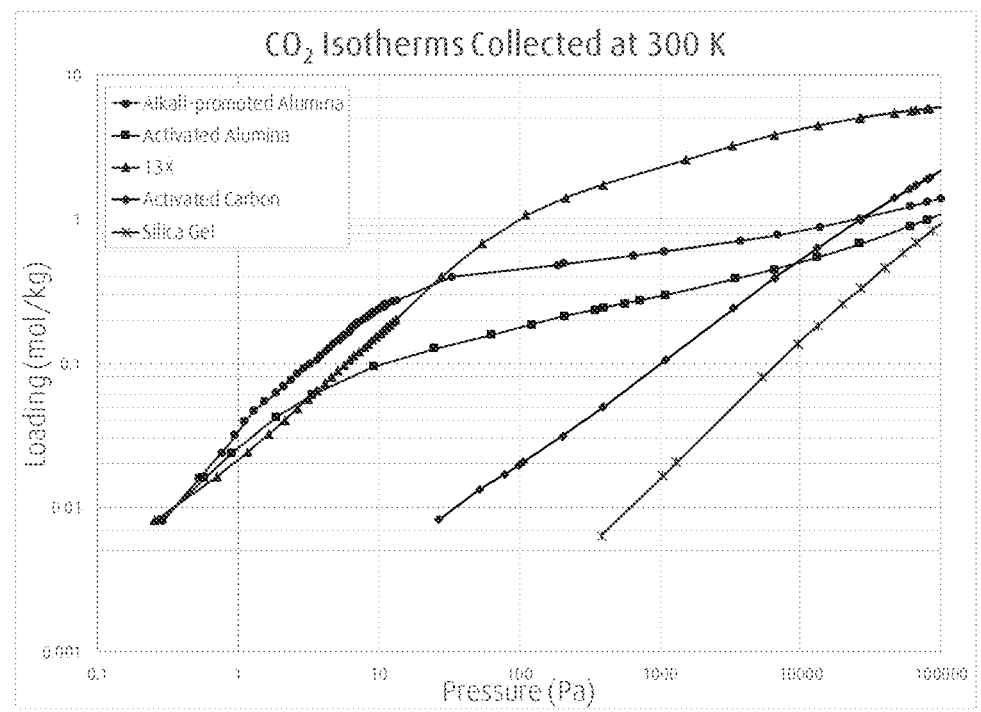
FIG. 1 illustrates the $CO_2$ isotherms collected at 300 K for selected adsorbents.

The present invention provides for a pressure swing adsorption (PSA) process for the substantial removal of $H_2O$ and $CO_2$ from a multicomponent feed gas to obtain a multicomponent product gas substantially free of $H_2O$ and $CO_2$ with high recovery of the product components. The process described herein is particularly applicable to the purification of synthesis gases including at least $H_2$, CO, $CH_4$, $CO_2$, and $H_2O$ to obtain a gas stream having at least $H_2$, CO, and $CH_4$ that is substantially free of $H_2O$ and $CO_2$ and to the purification of natural gases inclusive of at least $CH_4$, $N_2$, $CO_2$, and $H_2O$ to produce a gas stream having at least $CH_4$ and $N_2$ that is substantially free of $H_2O$ and $CO_2$.

More specifically, the substantial removal of $H_2O$ and $CO_2$ from a multicomponent feed gas stream is affected by passing the stream at elevated pressure through an adsorber to obtain, as the unadsorbed effluent, a multicomponent product gas substantially free of $H_2O$ and $CO_2$ with high recovery of the product gas components, the process includes subjecting each of the plurality of adsorbers to a series of process steps which include an adsorption step, three or more pressure equalization steps at decreasing pressure, a blowdown step, a purge step in which the purge gas includes a portion of the product gas or a gas originating externally from the process that is substantially free of $H_2O$ and $CO_2$ and includes at least one of the major components of the product gas. The process cycle further includes three or more pressure equalization steps at increasing pressure, and a final repressurization step, wherein each of the adsorbers contains at least one adsorbent layer comprising an adsorbent for the substantial removal of $CO_2$ characterized by:

i. a $CO_2$ loading capacity of greater than or equal to 0.1 mol $CO_2$ per kg of adsorbent at a $CO_2$ partial pressure of 1000 Pa at 300 K, and ii. a differential loading capacity of less than or equal to 0.1 mol of the product gas components per kg of adsorbent, where the differential capacity is defined as the difference between the loading capacity at partial pressures of 100,000 Pa and 10,000 Pa at 300 K.

The above described specifications define the necessary characteristics of the adsorbent selected for the substantial removal of $CO_2$ in the invented process. Specifically, the adsorbent responsible for removing $CO_2$ to below 100 ppb, preferably to less than 25 ppb. Adsorbents capable of simultaneously removing substantially all $CO_2$ from a multicomponent feed gas while having sufficiently low affinity for the product gas components (e.g., $H_2$, CO, $CH_4$, $N_2$) are preferred for use in the process of the present invention as they yield a multicomponent product gas substantially free of $H_2O$ and $CO_2$ with high recovery of the product gas components. For the invented process to be economically advantageous to the conventional purification processes, it must achieve product gas component recoveries of greater than or equal to 80% and preferably greater than or equal to 90%. Recovery, $X_i$, is herein defined as the flow rate of each component in the product gas relative to the flow rate of each component in the feed gas and is expressed algebraically as:

$$X_i[\%] = \frac{F_{Product} \cdot y^i_{Product}}{F_{Feed} \cdot y^i_{Feed}} \cdot 100\%$$

where:
i: gas component index (e.g., $H_2$, CO, $CH_4$)
$F_{Product}$: flow rate of the product gas
$F_{Feed}$: flow rate of the feed gas
$y_{Product}^i$: concentration of component i in the product gas
$y_{Feed}^i$: concentration of component i in the feed gas The $CO_2$ loading specification (i) is significant as it is an indicator of the adsorbent's effectiveness for removing trace levels of $CO_2$. For the conditions relevant to the invented process, the $CO_2$ partial pressure specification of 1000 Pa represents a $CO_2$ concentration of between approximately 1000 ppm at 10 bara and 150 ppm at 60 bara. This partial pressure range was selected as it is a reasonable approximation of the $CO_2$ concentration in the trace $CO_2$ removal section of the adsorber. Adsorbents exhibiting a $CO_2$ loading capacity of less than 0.1 moles of $CO_2$ per kg of adsorbent at a $CO_2$ partial pressure of 1000 Pa are not suitable for use in the process of the present invention as they require excessive quantities of adsorbent to produce a product gas substantially free of $CO_2$ and are unable to achieve high product gas recoveries due to the amount of product gas components adsorbed on the large adsorbent bed. Similarly, the differential loading specification (ii) is significant as it is an indicator of the potential losses of the product gas components during the PSA cycle. The specified partial pressure range approximately represents the partial pressures of the majority of product gas components at the beginning of the blowdown step and at the end of the purge step of the process of the present invention. These steps, blowdown and purge, are significant as they represent the window in the PSA cycle in which gas is rejected from the process, including the product gas components, and therefore the differential capacity specification is representative of the potential losses of each species in the process. Adsorbents exhibiting differential capacities of greater than 0.1 mol per kg of adsorbent for the product gas components result in the rejection of excessive quantities of the product gas components during the regeneration steps of the process of the present invention (e.g., blowdown and purge) such that high recoveries of the product gas components cannot be achieved.

Figure 2:
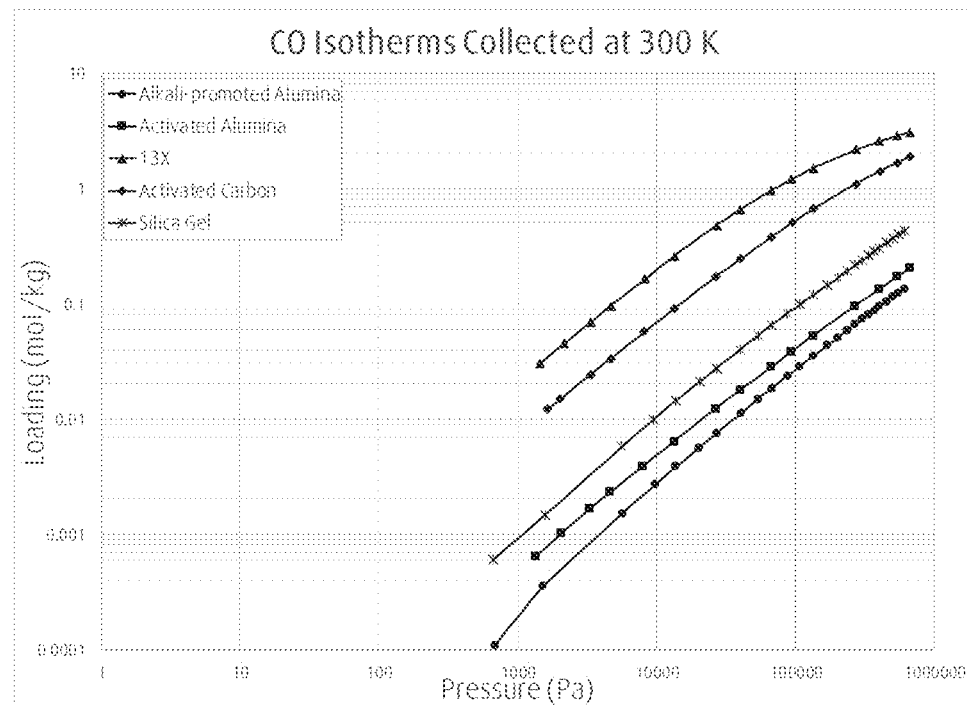
FIG. 2 depicts the CO isotherms collected at 300 K for selected adsorbents.
Figure 3:
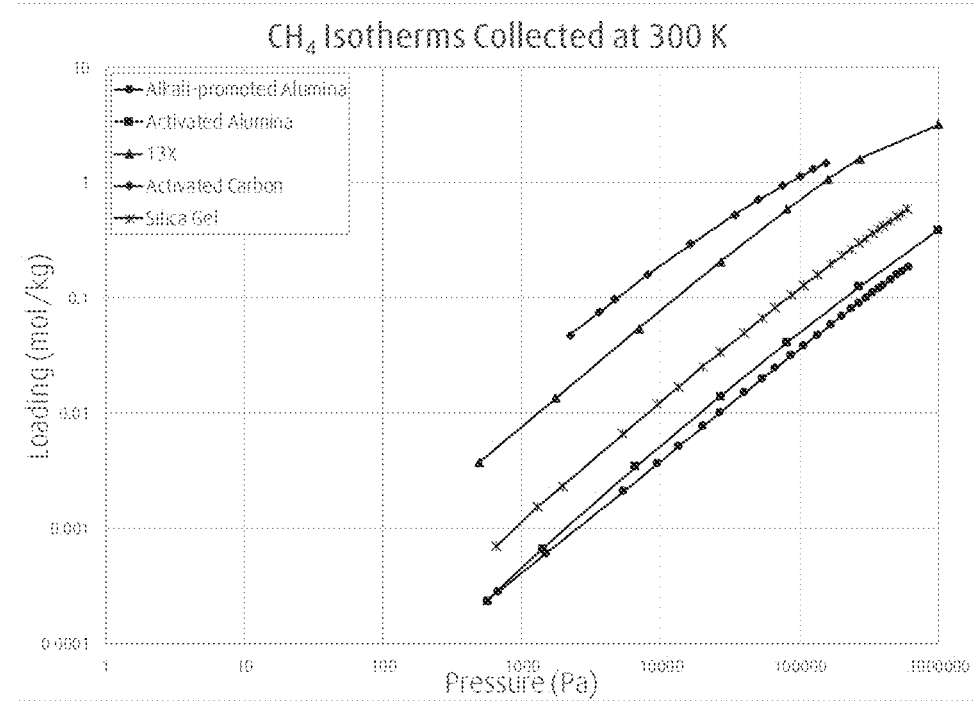
FIG. 3 illustrates the $CH_4$ isotherms collected at 300 K for selected adsorbents.

Application of the adsorbent specifications, (i) and (ii), to candidate adsorbents only requires isotherms for $CO_2$ and the components of the product gas. $CO_2$, CO, and $CH_4$ isotherms for selected $CO_2$-selectively adsorbents (i.e., alkali-promoted alumina, activated alumina, silica gel, activated carbon, and zeolite 13x) are provided in FIGS. 1, 2, and 3, respectively. $H_2$ isotherms are not provided as essentially all adsorbents meet specification (ii) for $H_2$. Application of the two adsorbent specifications, (i) and (ii), to the set of $CO_2$-selective adsorbents is summarized in Table 1. The alkali-promoted alumina, activated alumina, and zeolite 13x adsorbents meet the requirements of specification (i) and therefore exhibit the necessary $CO_2$ loading capacity in the trace $CO_2$ concentration range to be potentially suitable for use in the process of the present invention. Silica gel and activated carbon both exhibit insufficient $CO_2$ loading capacity in the trace $CO_2$ concentration range and can therefore be rejected as suitable adsorbents for the substantial removal of $CO_2$ in the present invention As noted above, all adsorbents meet the differential loading specification for $H_2$, however, of the selected adsorbents only the alkali-promoted and activated alumina adsorbents meet the differential loading specification for all three product gases —$H_2$, CO, and $CH_4$. Activated carbon and zeolite 13x exhibit very high differential loadings for CO and $CH_4$ indicating that they are unsuitable for use in the invented process as losses during the blowdown and purge steps would be too high. Interestingly, the silica gel adsorbents meets the requirements of specification (ii) for both $H_2$ and CO but fails to meet the criteria for $CH_4$. Application of the two specifications identified both alkali-promoted and activated aluminas as potentially suitable adsorbents for use in the trace $CO_2$ removal layer for the substantial removal of $CO_2$ in the process of the present invention. Silica gel, activated carbon, and zeolite 13x do not meet the adsorbent specifications and therefore are not potential candidate adsorbents for use in the trace $CO_2$ removal layer for the substantial removal of $CO_2$.

TABLE 1

| | Alkali-promoted Alumina | Activated Alumina | Silica Gel | Activated Carbon | 13X |
|---|---|---|---|---|---|
| Specification (i): $CO_2$ loading at 1000 Pa [mol/kg] | 0.59 | 0.29 | 0.016 | 0.097 | 2.18 |
| Specification (ii): Differential $H_2$ loading [mol/kg] | <0.01 | <0.01 | <0.03 | <0.03 | <0.03 |
| Specification (ii): Differential CO loading [mol/kg] | 0.024 | 0.036 | 0.082 | 0.46 | 1.06 |
| Specification (ii): Differential $CH_4$ capacity [mol/kg] | 0.032 | 0.044 | 0.108 | 0.93 | 0.62 |

Although the above illustration was provided for a syngas composition, the analysis is applicable to natural gas compositions inclusive of at least $CH_4$, $N_2$, $H_2O$, and $CO_2$. In NG applications, specification (ii) would be applied to at least $CH_4$ and $N_2$. Relevant NG compositions typically also include small chain hydrocarbons such as ethane, propane, butane, and pentane for example. The recovery of these small chain hydrocarbons with the $CH_4$-rich product gas free of $H_2O$ and $CO_2$ is also preferred.

Figure 4:
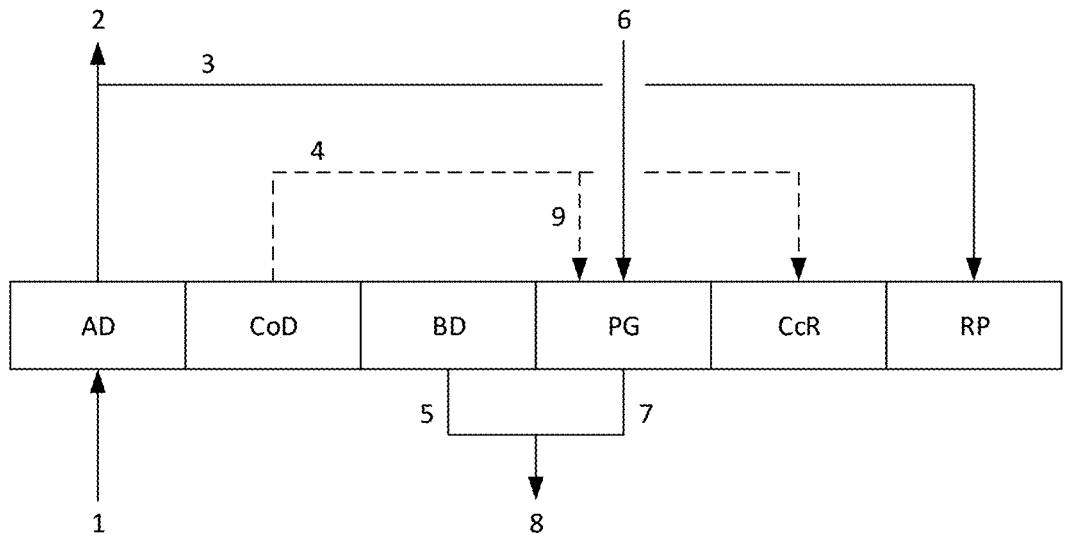
FIG. 4 depicts a schematic representation of a pressure swing adsorption (PSA) cycle.

The novel PSA process cycle of the present invention will now be described with reference to various exemplary embodiments. In the preferred exemplary embodiment of the PSA process cycle of the present invention, the process includes subjecting a plurality of adsorbers to a PSA cycle comprising the elementary phases of adsorption (AD), cocurrent depressurization (CoD), blowdown (BD), purge (PG), countercurrent repressurization (CcR), and final repressurization (RP), wherein the elementary cocurrent depressurization and countercurrent repressurization phases are inclusive of three (3) or more bed-to-bed equalization (EQ, EQ') steps and the purge gas includes a portion of the product gas or a gas originating externally from the process that is substantially free of $H_2O$ and $CO_2$ and further includes at least one of the major components of the product gas. It is understood that the elementary phases of the PSA cycle may include multiple steps of the same type. For example, the adsorption (AD) phase may comprise one or more adsorption steps (e.g., AD1, AD2, AD3, etc.). A schematic representation of the PSA cycle for a single adsorber showing the flow of gas for each of the elementary phases is illustrated in FIG. 4. The PSA cycle commences in the adsorption (AD) phase with the introduction of the multicomponent feed gas (1) to the bottom of the adsorber at an elevated pressure. The multicomponent feed gas flows from the bottom to the top of the adsorber. This upward flow direction in the adsorber will be referred to as co-current flow with respect to feed. During the adsorption phase, substantially all $H_2O$ and $CO_2$ are adsorbed on to the adsorbent and a multicomponent product gas substantially free of $H_2O$ and $CO_2$ (2) is obtained. The cycle advances and the adsorber enters the bed-to-bed depressurization equalization phase and the adsorber undergoes a series of at least 3 bed-to-bed depressurization steps. Equalization gas is transfer out the top of the adsorber in the co-current direction. The bed-to-bed depressurization steps are sometimes referred to as co-current depressurization steps. In the cocurrent depressurization (CoD) phase, gas is transferred, or refluxed, from the adsorber at high pressure to a lower-pressure adsorber in the countercurrent repressurization (CcR) phase. The adsorber progresses through the bed-to-bed depressurization steps in an increasing order, that is EQ1, EQ2, EQ3 and so on, and transfers equalization gas via at least one conduit (4) to lower pressure adsorbers that are progressing through the bed-to-bed repressurization steps of EQ3', EQ2', EQ1' respectively. To be clear, the adsorber in EQ(n) transfers gas to an adsorber in EQ(n)'. At the end of each equalization step, the pressure of the interacting adsorbers is approximately equal hence the term equalization. After completing the cocurrent depressurization (CoD), the adsorber proceeds to the blowdown (BD) phase. The purpose of the blowdown phase, also commonly known as the countercurrent depressurization phase, is to rid the adsorber of the impurities removed from the feed gas through the bottom of the adsorber (5). During the blowdown phase, the adsorber pressure decreases from the final pressure of the cocurrent depressurization (CoD) to the low or bottom pressure of the cycle. In the process of the present invention, the blowdown phase represents the largest contributor to the rejection, or loss, of the multicomponent product gas and, therefore, has the most significant effect on the overall recovery. Since the volume of gas rejected during the blowdown phase is proportional to the difference in adsorber pressure at the beginning and end of the blowdown phase, additional equalization steps serve to reduce the total volume of blowdown gas, which increases the overall recovery of the product gases by mass balance. The cycle subsequently progresses to the purge (PG) phase. In the purge phase, the adsorber is swept with a purge gas (6) introduced at the top of the adsorber flowing counter currently to the direction of the feed gas to expel contaminants out the bottom (7) of the adsorber at or near the bottom pressure of the PSA cycle. The purge phase is also commonly known as counter current elution. The expelled gas (7) can be combined with the blowdown gas (5) via a shared conduit (8) and routed to a vessel, commonly known as a blowdown or tail gas drum (not shown). In the process of the present invention, the purge gas (6) is substantially free of $H_2O$ and $CO_2$ and is comprised of at least one of the major components of the product gas that originates externally from the PSA process. With the purge gas being provided from an external source, the volume of purge gas utilized during the purge phase can be controlled independently of the PSA process cycle and thus has little effect on the overall recovery of the multicomponent product gas unlike PSA processes with a provide purge phase. In the process of the present invention, the volume of purge gas utilized during the purge phase is 0.05 to 0.30 times the volume of feed gas processed during the adsorption phase with both volumes of gas being based on standard conditions. With the completion of the purge phase, the cycle progresses to the countercurrent repressurization (CcR) phase in which the adsorber undergoes a series of at least 3 bed-to-bed repressurization (EQ') steps. The equalization gas is introduced through the top of the adsorber and flows counter currently to the direction of the feed gas. The bed-to-bed repressurization steps are sometimes referred to as counter-current repressurization steps. In the countercurrent repressurization (CcR) phase, the adsorber received gas from an adsorber at a higher pressure in the cocurrent depressurization (CoD) phase via at least one conduit (4). The adsorber progresses through the bed-to-bed repressurization steps in a decreasing order, that is EQ3', EQ2', EQ1' and so and receives equalization gas from higher pressure adsorbers that are progressing through the bed-to-bed depressurization steps of EQ3, EQ2, EQ1, respectively. With the completion of the bed-to-bed repressurization equalization phase, the cycle progresses to the final pressurization (RP) phase. The adsorber pressure is increased from the pressure at the end of the EQ' phase to near the top pressure of the PSA cycle using either a portion of the product gas (3) introduced to the top of the adsorber as shown in FIG. 4 or, optionally, a portion of the feed gas that is introduced to the bottom of the adsorber flowing in the co-current direction. With the completion of the PSA cycle, the adsorber is ready to return to the adsorption phase and repeat the cycle. For completeness, the invented process may include a Provide Purge Gas (PPG) as part of the cocurrent depressurization (CoD) phase. In the PPG step, gas is transferred cocurrently out the top of an adsorber and into the top of an adsorber in a purge (PG) step via a conduit (9) and expels contaminants out the bottom (7) of the adsorber at or near the bottom pressure of the PSA cycle.

It is understood that the PSA process cycle includes a plurality of adsorbers progressing through the PSA cycle and that the PSA cycle is designed such that at least one adsorber is in the adsorption phase to process feed gas and at least one adsorber is in the purge phase at all steps within the PSA cycle.

Figure 5:
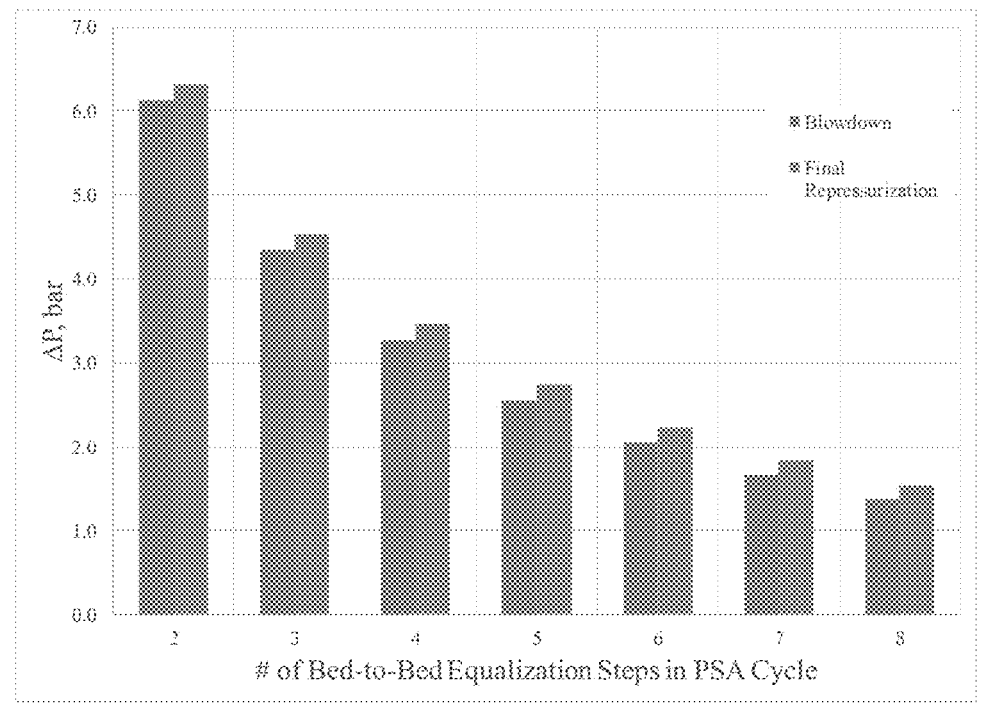
FIG. 5 illustrates the relationship between the number of bed-to-bed equalization steps in the PSA cycle and the pressure differential between the pressure in the adsorber at the beginning and end of the blowdown step and the pressure differential between the pressure in the adsorber at the beginning and end of the final repressurization step.

More specifically, the process of the present invention includes three or more bed-to-bed equalization steps, EQ(n≥3), to improve recovery of the multicomponent product gas by limiting the volume of gas rejected from the process during the blowdown step, BD. The volume of gas expelled from the process during the blowdown step is directly proportion to the difference between the pressure at the end of the final bed-to-bed equalization step and the pressure at the beginning of the purge phase. Since the purge pressure is typically set by factors external to the PSA process, the only parameter that can be adjusted to reduce the volume of gas expelled during the blowdown step and thus improve recovery is the pressure at which the blowdown step begins, also known as the intermediate pressure. FIG. 5 illustrates the relationship between the number of bed-to-bed equalization steps in the PSA cycle and the pressure differential between the pressure in the adsorber at the beginning and end of the blowdown step and the pressure differential between the pressure in the adsorber at the beginning and end of the final repressurization step. The blowdown pressure differential represents a loss of the process gas while the final repressurization differential pressure represents a loss in productivity of the PSA system as product gas is utilized to repressurize the bed. Increasing the number of bed-to-bed equalization steps lowers the pressure at the end of the final bed-to-bed equalization and therefore additional equalization steps serve to reduce the volume of blowdown gas thus increasing the overall recovery of the product gases by mass balance. In fact, it was not found possible for the process of the present invention to achieve a recovery of greater than 85% for cycles with fewer than 3 equalizations steps. Increasing the number of bed-to-bed equalization steps also reduces the quantity of gas required to pressurize the adsorber during final repressurization, RP, to near the top pressure of the PSA process cycle. The quantity of gas required for final repressurization reduces the productivity of the process and therefore the overall recovery. The combined effect of reducing losses by reducing the blowdown pressure and increasing the initial pressure of the final repressurization makes increasing the number of bed-to-bed equalization steps very desirable. Increasing the number of bed-to-bed equalizations is known in the field to improve recovery as shown in U.S. Pat. No. 8,435,328 B2 to Baksh et al. However, processes with high equalizations are typically reserved for very large throughputs as the additional equipment costs associated with higher EQ step cycles (i.e., 2 adsorbers/EQ step, additional adsorbent, control valves) is not economically justifiable. However, unlike in PSA processes that produce a high-purity single component product gas, such has 99.99+% $H_2$, the PSA process of the present invention produces a multicomponent product gas that is substantially free of $H_2O$ and $CO_2$, which has a significantly different value and therefore the justification for additional equipment cost associated with increased number of equalization steps can be easily made. Achieving recoveries of greater than 80% and preferably greater than 90% for the heavier components, for example CO and/or $CH_4$, can be very challenging as they interact with the adsorbents much more strongly than lighter gases that make up the multicomponent feed gases such as $H_2$ or $N_2$. Further, unlike in single component PSA processes, the composition of the refluxed gas becomes more concentrated in the heavier components with each subsequent equalization step, and therefore, increasing the number of equalization steps has a more significant effect on improving recovery of the heavier components in the multicomponent product gas.

Figure 6:
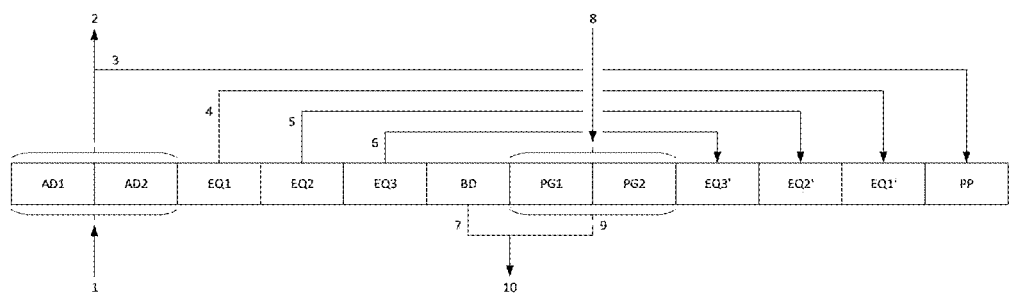
FIG. 6 illustrates a schematic representation of the cycle steps for a single adsorbent bed in 6-1-3 PSA process cycle in accordance with Example 1.

Advantageously, the novel PSA process of the present invention features a purge gas originating externally from the PSA process that is substantially free of $H_2O$ and $CO_2$ and comprises at least one of the major components of the product gas. The process of the present invention utilizes a purge gas that originates externally from the PSA cycle and, as such, the process does not exclusively rely on an internal provide purge gas (PPG) phase. Eliminating the PPG phase from the PSA cycle reduces the volume of product gas rejected and, therefore, improves recovery as the pressure loss experienced during the PPG phase can be beneficially refluxed within the process via at least one additional EQ step. That is, the volume of gas that would have been expelled from the process during the PPG phase can be retained within the process and thus improve the recovery of the multicomponent product gas. However, there may be scenarios, for example should the quantity of purge gas available at a plant or installation be limited or expensive, that utilizing an internally provided purge gas may be beneficial. In addition, the purge gas must be substantially free of $H_2O$ and $CO_2$ to effectively sweep the contaminants from the adsorber and to not contaminate the top portion of the adsorber. Further, it is necessary for the externally provided purge gas to include at least one of the major components of the product gas (e.g., $H_2$, CO, $CH_4$), and preferably multiple components of the product gas to achieve a desired recovery without introducing unwanted components in the multicomponent product gas. Preferably, the externally provided purge gas originates from a downstream process such as the tail gas from a $H_2$ PSA process unit, a CO-rich gas or $H_2$-rich gas from a cryogenic separation unit, or combinations thereof. More preferably, the composition of the externally provided purge gas is less rich in the heavier components of the product gas, for example CO and/or $CH_4$, than the gas transferred between the additional equalization steps, thus, beneficially improving the recovery of the heavier product gas components.

process, while the columns represent the step number. The sequence of steps is performed in the order recited in each of the adsorbent beds in turn. A schematic representation of a single bed progressing through the complete PSA cycle showing the flow of gas is provided in FIG. 6. The PSA process is comprised of six adsorbent beds, A, B, C, D, E, and F, with one (1) adsorbent bed processing feed gas at all times, three (3) bed-to-bed equalization steps, and a purge gas originating externally from the PSA process.

TABLE 2

| BED | Step # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | AD1 | AD2 | EQ1 | EQ2 | EQ3 | BD | PG1 | PG2 | EQ3' | EQ2' | EQ1' | RP |
| B | EQ1' | RP | AD1 | AD2 | EQ1 | EQ2 | EQ3 | BD | PG1 | PG2 | EQ3' | EQ2' |
| C | EQ3' | EQ2' | EQ1' | RP | AD1 | AD2 | EQ1 | EQ2 | EQ3 | BD | PG1 | PG2 |
| D | PG1 | PG2 | EQ3' | EQ2' | EQ1' | RP | AD1 | AD2 | EQ1 | EQ2 | EQ3 | BD |
| E | EQ3 | BD | PG1 | PG2 | EQ3' | EQ2' | EQ1' | RP | AD1 | AD2 | EQ1 | EQ2 |
| F | EQ1 | EQ2 | EQ3 | BD | PG1 | PG2 | EQ3' | EQ2' | EQ1' | RP | AD1 | AD2 |

The PSA cycle sequence will be described with reference to one adsorbent bed—Adsorbent Bed A—which undergoes the entire PSA cycle.

Steps 1-2: The multicomponent feed gas (21) is introduced to the bottom of Bed A from the Feed at high pressure. The multicomponent feed gas flows from the bottom to the top of Bed A. This upward flow direction will be referred to as co-current flow with respect to feed. During the adsorption step, substantially all $H_2O$ and $CO_2$ are adsorbed on to the adsorbent and a multicomponent product gas substantially free of $H_2O$ and $CO_2$ is obtained (22). Bed A remains in the adsorption step for steps one and two (i.e., AD1 and AD2) for the example 6-1-3 cycle.

Step 3: Bed A subsequently undergoes the first bed-to-bed equalization step (EQ1) while Bed C is counter-currently receiving the equalization gas—step (EQ1')—via conduit (24). This bed-to-bed equalization step is sometimes referred to as co-current depressurization step. The pressures of both beds are approximately equal at the end of this step.

Step 4: The cycle step progresses and Bed A undergoes the second equalization step (EQ2) while Bed D is counter-currently receiving the equalization gas—step (EQ2')—via conduit (25). The pressures of both beds are approximately equal at the end of this step.

Step 5: The cycle step progresses and Bed A undergoes the second equalization step (EQ3) while Bed E is counter-currently receiving the equalization gas—step (EQ3')—via conduit (26). The pressures of both beds are approximately equal at the end of this step.

Step 6: Bed A then proceeds to Step 6, blowdown (BD). The purpose of this step is to expel impurities adsorbed during co-current steps (AD, EQ) from the adsorbent bed through the bottom of the adsorbent Bed A via conduit (27). As a result, contaminants are desorbed and counter-currently directed to a shared waste gas header (30).

Steps 7 & 8: Bed A subsequently progresses to the first purge (PG1) step. Purge gas (28) originating externally from the PSA is introduced to the top of Bed A and flows counter-current to the direction of the feed gas. The purge gas, being substantially free of $H_2O$ and $CO_2$, sweeps the contaminants from the adsorbent bed through the bottom of the adsorbent bed via conduit (29). As a result, contaminants are desorbed and counter-currently directed to a shared

EXAMPLES

The present invention will be more thoroughly described with the assistance of a set of examples featuring embodiments. The performance of the PSA processes described in the subsequent examples were obtained via a detailed adsorption model, based upon the governing material and energy balances involved in the process. Flow in the adsorption model was described by the axial dispersed plug flow model. Additional characteristics of the model include: bed pressure drop, multicomponent isotherm (as determined by the loading ratio correlation), adiabatic energy balance and adsorption rate (as determined by the linear driving force). The simulation results were found to agree well with pilot scale experimental process performance results.

The invention is further explained through the following examples, and those based on various embodiments of the invention, which are not to be construed as limiting the present invention.

Example 1

A preferred embodiment of the PSA process cycle of the present invention is described herein with reference to a 6-bed system employing the PSA cycle in Table 2. In this Table 2, the rows correspond to a particular bed in the PSA waste gas header (30). Bed A remains in the purge step for steps 7) and 8 (i.e., PG1 and PG2) for the example 6-1-3 cycle.

Step 9: Bed A progresses to the first bed-to-bed repressurization equalization step (EQ3') and receives equalization gas from Bed C via conduit (26). The adsorbent beds in (EQ3) and (EQ3') steps are interacting such that gas in Bed C is transferred to Bed A until the pressures in both beds are equalized.

Step 10: Bed A progresses to the second bed-to-bed repressurization equalization step (EQ2') and receives equalization gas from Bed C via conduit (25). The adsorbent beds in (EQ2) and (EQ2') steps are interacting such that gas in Bed D is transferred to Bed A until the pressures in both beds are equalized.

Step 11: Bed A progresses to the third bed-to-bed repressurization equalization step (EQ1') and receives equalization gas from Bed C via conduit (24). The adsorbent beds in (EQ1) and (EQ1') steps are interacting such that gas in Bed E is transferred to Bed A until the pressures in both beds are equalized.

Step 12: The last step in the cycle for Bed A is the final repressurization (RP) step. In this example, a portion of the product gas via conduit (3) is employed to further raise the pressure in the adsorbent bed to near the product pressure.

Figure 7:
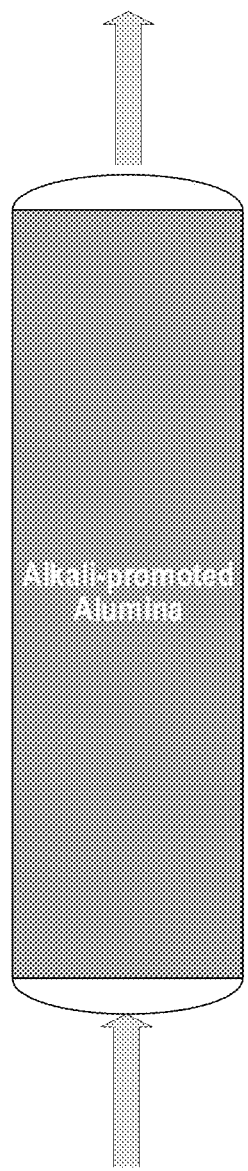
FIG. 7 illustrates an alkali-promoted alumina adsorbent bed employed to remove $H_2O$ and $CO_2$ from the multicomponent feed.

The performance of the PSA process operating the 6-1-3 cycle with adsorbent beds containing a single layer of alkali-promoted alumina, activated alumina, silica gel, activated carbon, or molecular sieve 13× was obtained by simulation using the detailed adsorption model described herein above. The process conditions for the simulation are given in Table 3 and the time for each step was 60 s giving a total cycle time of 720 s. An exemplary adsorber layering is illustrated in FIG. 7 for the alkali-promoted alumina case.

TABLE 3

| Parameter | Value |
|---|---|
| High Pressure [bara] | 23.14 |
| Low Pressure [bara] | 1.30 |
| Bed Dia [m] | 1.98 |
| Feed Gas Rate [kmol/h] | 1000.0 |
| Feed Gas Temperature [K] | 310 |
| Feed Gas Comp. [%] | 73.30% $H_2$, 14.55% CO, 5.22% $CH_4$, 6.65% $CO_2$, 0.28% $H_2O$ |
| Purge Gas Comp. [%] | 84.15% $H_2$, 4.00% CO, 11.85% $CH_4$ |
| Purge Gas Rate [kmol/h] | 121.55 |
| Purge Gas Temperature [K] | 293 |

The results are presented in Table 4, below. In this example, adsorbent beds containing either of the alumina adsorbents (i.e., alkali-promoted and activated), both of which exhibit the required characteristic of the present invention, produced a multicomponent product gas substantially free of $H_2O$ and $CO_2$ with $H_2$, CO, and $CH_4$ recoveries exceeding 80%. Adsorbent beds containing the silica gel adsorbent, which does not exhibit the $CO_2$ loading characteristic, produced a product gas substantially free of $H_2O$ and $CO_2$ but required an adsorbent bed length of approximately 2-times that of the alumina adsorbent bed length. The higher loading capacity of the silica gel adsorbent for CO and $CH_4$ compared to the alumina adsorbents and the longer bed length led to significantly lower recoveries particularly for the heavier product gas components (i.e., CO and $CH_4$). Adsorbent beds containing the activated carbon adsorbent and the 13× molecular sieve adsorbent, both of which do not exhibit the $CO_2$ loading or differential loading characteristics, were found to produce a product gas substantially free of $H_2O$ and $CO_2$ but required an adsorber length of approximately 1.5-times that of the alumina adsorbent bed length. Further, due to the much higher loading capacity of CO and $CH_4$ for both adsorbents compared to the alumina adsorbents and the longer bed length to achieve the required $CO_2$ removal specification, the recoveries of the product gas components, CO and $CH_4$, are much lower and incapable of producing a multicomponent product gas substantially free of $H_2O$ and $CO_2$ with high recovery of the product gas components.

From the results summarized in Table 4, it is evident that for the PSA process of the current example to produce a multicomponent product gas substantially free of $H_2O$ and $CO_2$ and simultaneously achieve sufficient recovery of the multicomponent product gas to be economically advantageous, for example a recovery >80%, the $CO_2$-selective adsorbent must exhibit both required characteristics of the process of the present invention, that is:

i. a $CO_2$ loading capacity of greater than or equal to 0.1 mol $CO_2$ per kg of adsorbent at a $CO_2$ partial pressure of 1000 Pa at 300 K, and ii. a differential capacity of the product gas components of less than or equal to 0.1 mol per kg of adsorbent, where the differential capacity is defined as the difference between the loading capacity at partial pressures of 100,000 Pa and 10,000 Pa at 300 K.

PSA processes that utilize $CO_2$-selective adsorbent that do not exhibit the above characteristics are unable to simultaneously produce a multicomponent product gas that is substantially free of $CO_2$ and achieve recovery that enables the process to be economically competitive.

TABLE 4

| Adsorbent | $CO_2$ Loading Criteria | Differential Loading Criteria | Bed Height [m] | $CO_2$ Impurity [ppb] | Recovery [%] | | |
|---|---|---|---|---|---|---|---|
| | | | | | $H_2$ | CO | $CH_4$ |
| Alkali-promoted Alumina | Yes | Yes | 5.49 | <1 | 94.0 | 86.5 | 83.1 |
| Activated Alumina | Yes | Yes | 5.49 | <1 | 94.0 | 83.6 | 88.3 |
| Silica Gel | No | Yes | 12.2 | <1 | 92.5 | 32.0 | 26.0 |
| Activated Carbon | No | No | 9.1 | <1 | 92.0 | 1.0 | 8.0 |
| 13X Zeolite | Yes | No | 9.1 | <1 | 93.0 | 2.0 | 11.9 |

It should be noted that the twelve-step PSA cycle, above, is illustrative only and is given to demonstrate the benefit of the invented process. Other PSA cycles may also be used to show the enhanced PSA process performance obtained in accordance with the invention without deviating from its scope.

Example 2

Figure 8:
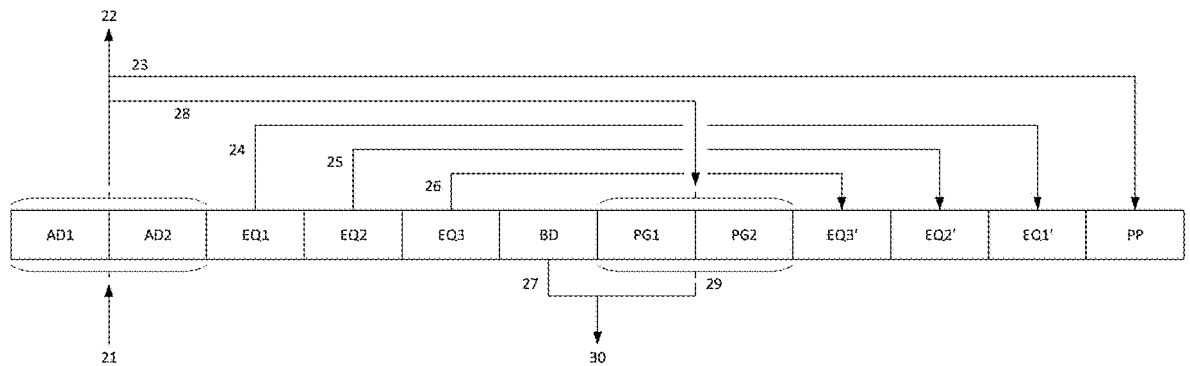
FIG. 8 is a schematic representation of the cycle steps for a single adsorbent bed in accordance with Example 2.

The necessity for specifying three or more bed-to-bed equalization steps in the invented process to achieve economically advantageous recoveries of the multicomponent product gas is illustrated herein. The performance of PSA systems operating 5-1-2, 6-1-3, 7-1-4, 8-1-5, 9-1-6, 10-1-7, and 11-1-8 PSA cycles was obtained by simulation utilizing the detailed adsorption model described herein above for adsorbers containing an alkali-promoted alumina adsorbent. A typical adsorbent loading is illustrated in FIG. 7. The nomenclature utilized herein to refer to the cycles, and by way of example in a 6-1-3 cycle, the first number refers to the number of beds in the PSA system, the second number refers to the number of beds in parallel feed (i.e., at any instant processing feed) and the last number refers to the number of bed-to-bed equalization steps in a particular cycle. The process conditions for the simulation are given in Table 5. In this example, a portion of the multicomponent product gas substantially free of $H_2O$ and $CO_2$ is used as the purge gas. A schematic representation of the PSA cycle for a single adsorbent bed showing the flow of gas for each of the cycle steps is illustrated in FIG. 8.

TABLE 5

| Parameter | Value |
| --- | --- |
| High Pressure [bara] | 23.14 |
| Low Pressure [bara] | 1.30 |
| Bed Dia [m] | 1.98 |
| Feed Gas Rate [kmol/h] | 1000.0 |
| Feed Gas Temperature [K] | 310 |
| Feed Gas Comp. [%] | 73.30% $H_2$, 14.55% CO, 5.22% $CH_4$, 6.65% $CO_2$, 0.28% $H_2O$ |
| Purge Gas Comp. [%] | Product Gas |
| Purge Gas Rate [kmol/h] | 121.55 |

The PSA systems were designed specifically to illustrate the effect of the number of equalization steps on the performance of the invented process and as such all other parameters in the cycle remain unchanged. Results of the simulations are presented in Table 6. Increasing the number of bed-to-bed equalization steps was found to increase the recovery of all product gas components (i.e., $H_2$, CO, and $CH_4$) as expected. In the current example, increasing the number of equalization steps to 3 or more was necessary to achieve a CO and $CH_4$ recovery in excess of 80%. Increasing the number of equalization steps results in an increase in the number of beds in the PSA system and therefore higher equipment costs. The benefit of improved recovery of the product gas components must be considered in light of the increased equipment cost of the PSA system.

TABLE 6

| PSA Process # of Beds - Beds in Feed - Beds in EQ | # of Steps | | | | | | | Recovery [%] | | |
| --- | --- | --- | --- | --- | --- | --- | --- | --- | --- | --- |
| | AD | EQ | BD | PG | EQ' | RP | Total | $H_2$ | CO | $CH_4$ |
| 5-1-2 | 2 | 2 | 1 | 2 | 2 | 1 | 10 | 91.3 | 82.5 | 78.6 |
| 6-1-3 | 2 | 3 | 1 | 2 | 3 | 1 | 12 | 94.0 | 86.5 | 83.1 |
| 7-1-4 | 2 | 4 | 1 | 2 | 4 | 1 | 14 | 95.3 | 88.9 | 85.8 |
| 8-1-5 | 2 | 5 | 1 | 2 | 5 | 1 | 16 | 96.5 | 90.8 | 88.0 |
| 9-1-6 | 2 | 6 | 1 | 2 | 6 | 1 | 18 | 97.2 | 92.2 | 89.6 |
| 10-1-7 | 2 | 7 | 1 | 2 | 7 | 1 | 20 | 97.8 | 93.2 | 90.8 |
| 11-1-8 | 2 | 8 | 1 | 2 | 8 | 1 | 22 | 97.8 | 93.6 | 91.4 |

Example 3

Figure 9:
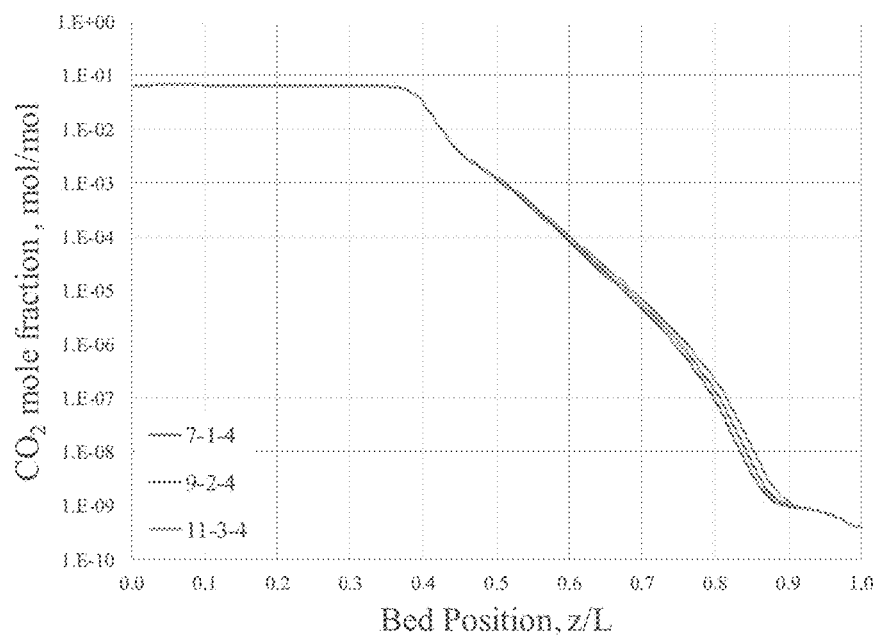
FIG. 9 is a graphic representation of the gas-phase $CO_2$ concentration profile in the adsorbent bed at the end of the adsorption step discussed in Example 3.

An additional exemplary embodiment of the present invention is the beneficial effect of increasing the number of adsorbent beds simultaneously receiving feed gas. In other words, the number of beds processing feed gas in parallel. To illustrate this benefit, three system design cases are considered featuring 1, 2, and 3 adsorbent beds simultaneously receiving feed gas—7-1-4, 9-1-4, and 11-3-4, respectively. The cycles have been designed such that the number of bed-to-bed equalization steps—four (4)—and the adsorption and purge phase times are constant for all cases. The performance of the three PSA systems was simulated using the process conditions provided in Table 3 and results are presented in Table 7, below. The recovery of the product gas components is greater than 85% for each of the individual components (i.e., $H_2$, CO, and $CH_4$). Since the PSA process cycles are essentially the same for all cases, the performance of each of the adsorbent beds is essentially the same as illustrated by the contaminant concentration profile in FIG. 9. In this exemplary embodiment, increasing the number of beds simultaneously processing feed gas increases the number of beds in the system by 2 for each additional bed processing feed gas and therefore the number of vessels and the system complexity (e.g., control valves) increase, however, the cross-sectional area of the adsorbent beds and correspondingly the adsorbent quantity in the beds decreases. That is, in the current example, the 2-bed (9-2-4) and 3-bed (11-3-4) on feed systems contain 36% and 48% less adsorbent than the 1-bed (7-1-4) on feed system. In the exemplary PSA cycle, increasing the number of adsorbent beds simultaneously processing feed gas does not affect system performance in terms of the product gas recovery or purity, however, significant capital savings may be realized especially when the adsorbent cost is high.

TABLE 7

| PSA Process # of Beds - Beds in Feed - Beds in EQ | # of Steps | | | | | | Step Time [s] | Recovery [%] | | |
|---|---|---|---|---|---|---|---|---|---|---|
| | AD | EQ | BD | PG | EQ' | RP | Total | | $H_2$ | CO | $CH_4$ |
| 7-1-4 | 2 | 2 | 1 | 2 | 2 | 1 | 10 | 60 | 95.3 | 88.9 | 85.8 |
| 9-2-4 | 2 | 3 | 1 | 2 | 3 | 1 | 12 | 30 | 95.4 | 89.0 | 85.9 |
| 11-3-4 | 2 | 4 | 1 | 2 | 4 | 1 | 14 | 20 | 95.4 | 89.0 | 85.9 |

Example 4

Figure 10:
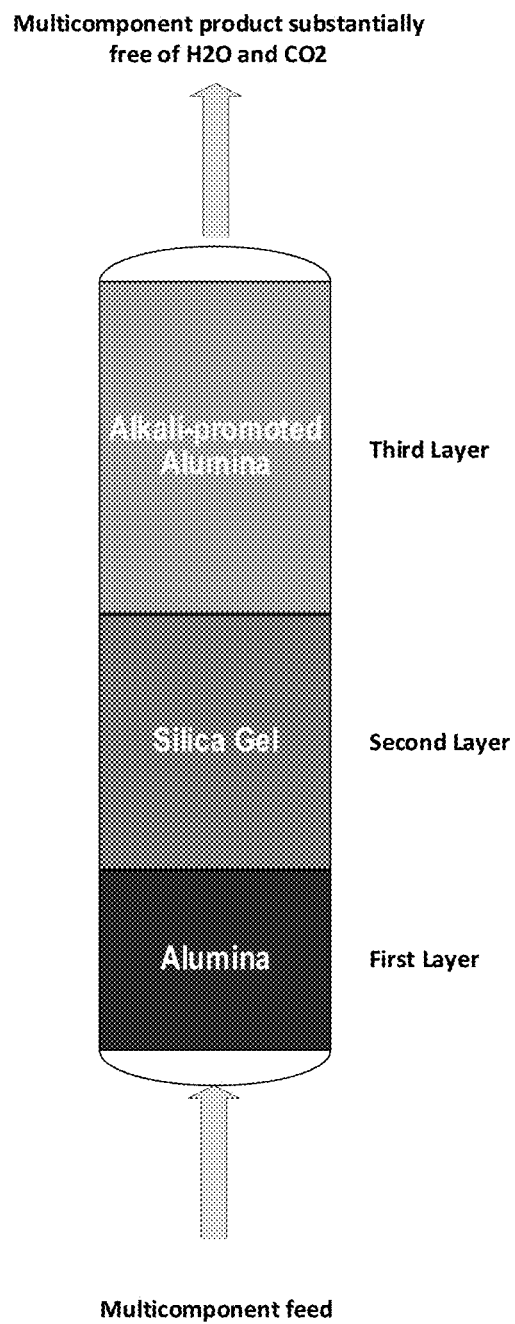
FIG. 10 illustrates the adsorbent bed layering in the adsorbent bed discussed in Example 4.

An additional embodiment of the present invention is the potentially beneficial utilization of multiple layers of adsorbent. In this example, a 16-3-8 PSA cycle consisting of 16 adsorbent beds with 3 beds concurrently receiving feed gas and 8 pressure equalization steps is employed. The elementary step sequence and relative arrangement in time for each of the 16 adsorber vessels is provided in Table 8. The adsorbent beds of the PSA system each contain three layers of solid adsorbent material, ordered by their relative distance from the end of the adsorbent bed to which the feed gas is introduced during the adsorption step. The first layer is comprised of 1 ft of an activated alumina adsorbent used for removal of the majority of $H_2O$ from the feed gas stream. The second layer is comprised of 7 ft of silica gel adsorbent used for removing substantially all the of $H_2O$ and the bulk of the $CO_2$. The third layer is an alkali-promoted alumina adsorbent used for removing substantially all of the $CO_2$. The adsorbent layering for this example is illustrated in FIG. 10. The performance of the PSA system was simulated using the process conditions provided in Table 3 using a 30 second step time. The PSA process was found to produce a syngas substantially free of $H_2O$ and $CO_2$ having a mean concentration of 80.40% $H_2$, 14.33% CO, and 5.27% $CH_4$ giving component recoveries of 98.97%, 88.85%, 90.96% for $H_2$, CO, and $CH_4$ respectively. This example illustrates that necessity of utilizing an adsorbent for the substantial removal of $CO_2$ that exhibits the required characteristics described herein above.

Example 5

Figure 11:
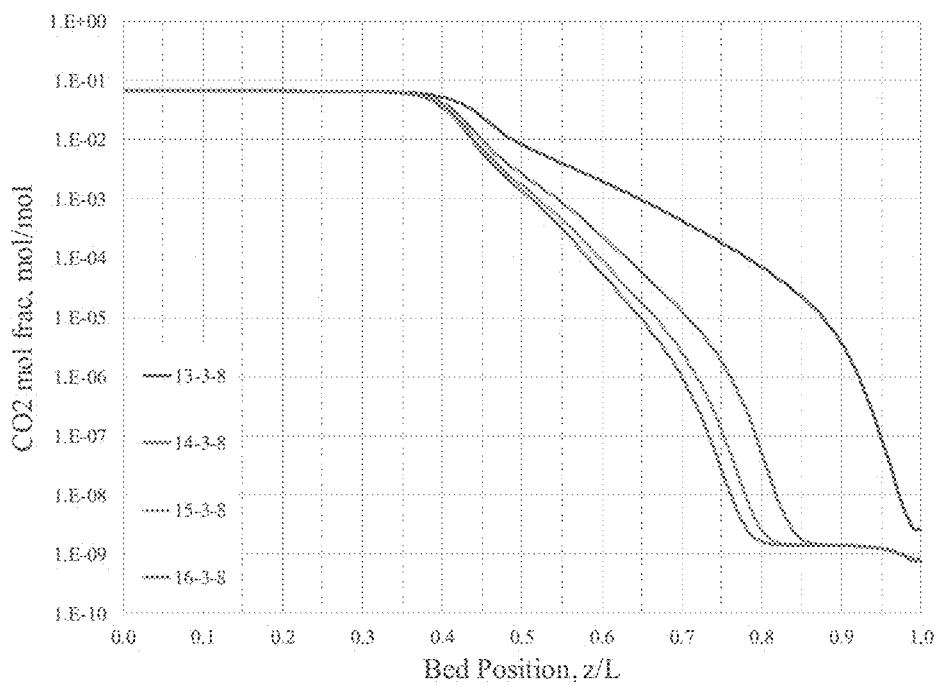
FIG. 11 illustrates the gas-phase $CO_2$ concentration profile in the adsorbent bed at the end of the adsorption step discussed in Example 5.
Figure 12:
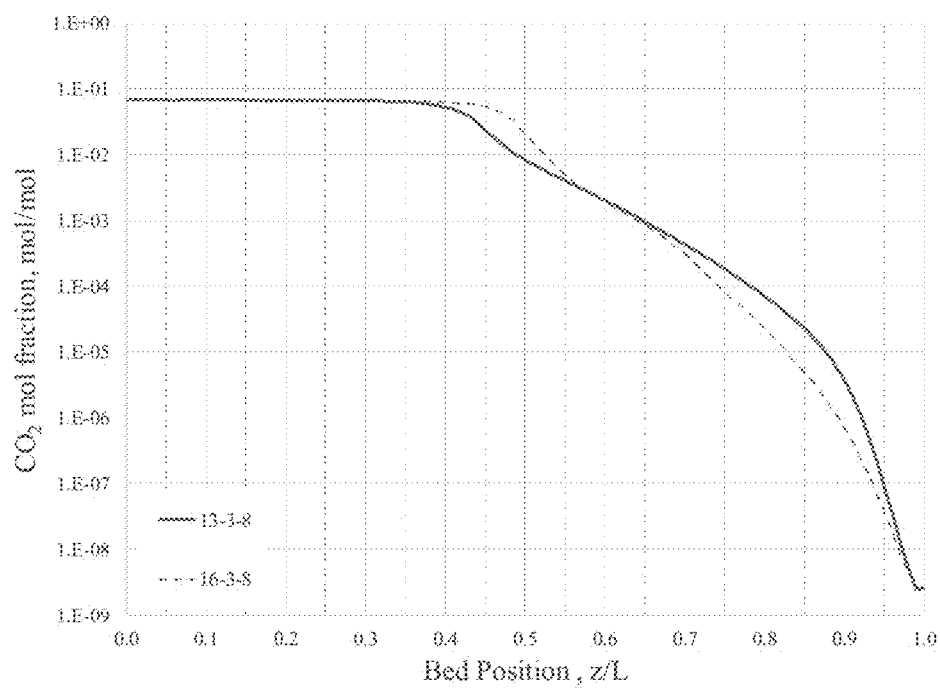
FIG. 12 illustrates the gas-phase $CO_2$ concentration profile in the adsorbent bed at the end of the adsorption step for the 13-bed and 16-bed PSA systems discussed in Example 5.

An additional embodiment of the present invention is the benefit of increasing the total number of beds in the PSA system while maintaining the number of beds simultaneously processing feed gas and the number of bed-to-bed equalizations steps. This increases the total of number of steps and these additional steps can beneficially be assigned to the purge phase. In the current example, four PSA systems with 13, 14, 15, and 16 adsorbent beds having 2 steps (60 s), 4 steps (120 s), 6 steps (180 s), and 8 steps (240 s) of purge respectively are considered. The performance of the PSA systems was simulated using the process conditions provided in Table 3 and the adsorbent layering illustrated in FIG. 10. That is, 1 ft of activated alumina for bulk $H_2O$ removal, 7 ft of silica gel for trace $H_2O$ and bulk $CO_2$ removal, and 12 ft of alkali-promoted alumina for trace $CO_2$ removal. Increasing the number of purge steps, effectively the purge time, resulted in very little difference in the product gas component recovery with the $H_2$, CO, and $CH_4$ recoveries being 98.8±0.1%, 88.0±0.1%, and 90.4±0.1% respectively. Although the PSA systems exhibited essentially the same product gas component recovery, the increased number of purge steps, or in other words the increased purge time, led to the $CO_2$ concentration front being much lower in the adsorbent bed as illustrated by the $CO_2$ concentration profiles in FIG. 11. The depressed $CO_2$ concentration front is the results of deeper regeneration during the longer purge times. As such, it is possible to shorten the adsorbent beds of the 14-, 15-, and 16-adsorbent bed systems to achieve the same $CO_2$ profile at the 13-adsorber system. For the purposes of this example, the adsorbent bed for the 16-3-8 PSA system was shorted from 1 ft alumina—7 ft silica gel—12 ft alkali-promoted alumina to 1 ft alumina—6 ft silica gel—9 ft alkali-promoted alumina, a 20% reduction in adsorbent inventory, to achieve the same $CO_2$ concentration profile as the 13-adsorbent bed system as illustrated in FIG. 12. Decreasing the length of the adsorbent bed for the 16-3-8 PSA system improved the $H_2$, CO, and $CH_4$ recoveries to 99.1%, 91.3%, and 93.9% respectively. Proportional improvements in the product gas component recoveries are anticipated for the 15-3-8 and 14-3-8 PSA systems. Although the 16-bed system has 3 more adsorbers than the 13-bed system, the total adsorbent inventory is only 6.7% greater since the adsorbent bed is 20% shorter. Further, although the 16-3-8 system may be more complex and be a have a slightly higher equipment cost, the benefit of the product gas recovery improvement may outweigh the additional costs.

TABLE 8

| | Step Number | | | | | | | | | | | | | | | | | |
|---|---|---|---|---|---|---|---|---|---|---|---|---|---|---|---|---|---|---|
| Bed # | 1 | 2 | 3 | 4 | 5 | 6 | 7 | 8 | 9 | 10 | 11 | 12 | 13 | 14 | 15 | 16 | 17 | 18 |
| 1 | A1 | A2 | A3 | A4 | A5 | A6 | EQ1 | EQ2 | EQ3 | EQ4 | EQ5 | EQ6 | EQ7 | EQ8 | BD | PG1 | PG2 | PG3 |
| 2 | EQ1' | PP | A1 | A2 | A3 | A4 | A5 | A6 | EQ1 | EQ2 | EQ3 | EQ4 | EQ5 | EQ6 | EQ7 | EQ8 | BD | PG1 |
| 3 | EQ3' | EQ2' | EQ1' | PP | A1 | A2 | A3 | A4 | A5 | A6 | EQ1 | EQ2 | EQ3 | EQ4 | EQ5 | EQ6 | EQ7 | EQ8 |
| 4 | EQ5' | EQ4' | EQ3' | EQ2' | EQ1' | PP | A1 | A2 | A3 | A4 | A5 | A6 | EQ1 | EQ2 | EQ3 | EQ4 | EQ5 | EQ6 |
| 5 | EQ7' | EQ6' | EQ5' | EQ4' | EQ3' | EQ2' | EQ1' | PP | A1 | A2 | A3 | A4 | A5 | A6 | EQ1 | EQ2 | EQ3 | EQ4 |
| 6 | PG8 | EQ8' | EQ7' | EQ6' | EQ5' | EQ4' | EQ3' | EQ2' | EQ1' | PP | A1 | A2 | A3 | A4 | A5 | A6 | EQ1 | EQ2 |
| 7 | PG6 | PG7 | PG8 | EQ8' | EQ7' | EQ6' | EQ5' | EQ4' | EQ3' | EQ2' | EQ1' | PP | A1 | A2 | A3 | A4 | A5 | A6 |
| 8 | PG4 | PG5 | PG6 | PG7 | PG8 | EQ8' | EQ7' | EQ6' | EQ5' | EQ4' | EQ3' | EQ2' | EQ1' | PP | A1 | A2 | A3 | A4 |
| 9 | PG2 | PG3 | PG4 | PG5 | PG6 | PG7 | PG8 | EQ8' | EQ7' | EQ6' | EQ5' | EQ4' | EQ3' | EQ2' | EQ1' | PP | A1 | A2 |
| 10 | BD | PG1 | PG2 | PG3 | PG4 | PG5 | PG6 | PG7 | PG8 | EQ8' | EQ7' | EQ6' | EQ5' | EQ4' | EQ3' | EQ2' | EQ1' | PP |
| 11 | EQ7 | EQ8 | BD | PG1 | PG2 | PG3 | PG4 | PG5 | PG6 | PG7 | PG8 | EQ8' | EQ7' | EQ6' | EQ5' | EQ4' | EQ3' | EQ2' |
| 12 | EQ5 | EQ6 | EQ7 | EQ8 | BD | PG1 | PG2 | PG3 | PG4 | PG5 | PG6 | PG7 | PG8 | EQ8' | EQ7' | EQ6' | EQ5' | EQ4' |

TABLE 8-continued

| | | | | | | | | | | | | | | | | |
|---|---|---|---|---|---|---|---|---|---|---|---|---|---|---|---|---|
| 13 | EQ3 | EQ4 | EQ5 | EQ6 | EQ7 | EQ8 | BD | PG1 | PG2 | PG3 | PG4 | PG5 | PG6 | PG7 | PG8 | EQ8' | EQ7' | EQ6' |
| 14 | EQ1 | EQ2 | EQ3 | EQ4 | EQ5 | EQ6 | EQ7 | EQ8 | BD | PG1 | PG2 | PG3 | PG4 | PG5 | PG6 | PG7 | PG8 | EQ8' |
| 15 | A5 | A6 | EQ1 | EQ2 | EQ3 | EQ4 | EQ5 | EQ6 | EQ7 | EQ8 | BD | PG1 | PG2 | PG3 | PG4 | PG5 | PG6 | PG7 |
| 16 | A3 | A4 | A5 | A6 | EQ1 | EQ2 | EQ3 | EQ4 | EQ5 | EQ6 | EQ7 | EQ8 | BD | PG1 | PG2 | PG3 | PG4 | PG5 |

| Bed # | Step Number | | | | | | | | | | | | | |
|---|---|---|---|---|---|---|---|---|---|---|---|---|---|---|
| | 19 | 20 | 21 | 22 | 23 | 24 | 25 | 26 | 27 | 28 | 29 | 30 | 31 | 32 |
| 1 | PG4 | PG5 | PG6 | PG7 | PG8 | EQ8' | EQ7' | EQ6' | EQ5' | EQ4' | EQ3' | EQ2' | EQ1' | PP |
| 2 | PG2 | PG3 | PG4 | PG5 | PG6 | PG7 | PG8 | EQ8' | EQ7' | EQ6' | EQ5' | EQ4' | EQ3' | EQ2' |
| 3 | BD | PG1 | PG2 | PG3 | PG4 | PG5 | PG6 | PG7 | PG8 | EQ8' | EQ7' | EQ6' | EQ5' | EQ4' |
| 4 | EQ7 | EQ8 | BD | PG1 | PG2 | PG3 | PG4 | PG5 | PG6 | PG7 | PG8 | EQ8' | EQ7' | EQ6' |
| 5 | EQ5 | EQ6 | EQ7 | EQ8 | BD | PG1 | PG2 | PG3 | PG4 | PG5 | PG6 | PG7 | PG8 | EQ8' |
| 6 | EQ3 | EQ4 | EQ5 | EQ6 | EQ7 | EQ8 | BD | PG1 | PG2 | PG3 | PG4 | PG5 | PG6 | PG7 |
| 7 | EQ1 | EQ2 | EQ3 | EQ4 | EQ5 | EQ6 | EQ7 | EQ8 | BD | PG1 | PG2 | PG3 | PG4 | PG5 |
| 8 | A5 | A6 | EQ1 | EQ2 | EQ3 | EQ4 | EQ5 | EQ6 | EQ7 | EQ8 | BD | PG1 | PG2 | PG3 |
| 9 | A3 | A4 | A5 | A6 | EQ1 | EQ2 | EQ3 | EQ4 | EQS | EQ6 | EQ7 | EQ8 | BD | PG1 |
| 10 | A1 | A2 | A3 | A4 | A5 | A6 | EQ1 | EQ2 | EQ3 | EQ4 | EQ5 | EQ6 | EQ7 | EQ8 |
| 11 | EQ1' | PP | A1 | A2 | A3 | A4 | A5 | A6 | EQ1 | EQ2 | EQ3 | EQ4 | EQ5 | EQ6 |
| 12 | EQ3' | EQ2' | EQ1' | PP | A1 | A2 | A3 | A4 | A5 | A6 | EQ1 | EQ2 | EQ3 | EQ4 |
| 13 | EQ5' | EQ4' | EQ3' | EQ2' | EQ1' | PP | A1 | A2 | A3 | A4 | A5 | A6 | EQ1 | EQ2 |
| 14 | EQ7' | EQ6' | EQ5' | EQ4' | EQ3' | EQ2' | EQ1' | PP | A1 | A2 | A3 | A4 | A5 | A6 |
| 15 | PG8 | EQ8' | EQ7' | EQ6' | EQ5' | EQ4' | EQ3' | EQ2' | EQ1' | PP | A1 | A2 | A3 | A4 |
| 16 | PG6 | PG7 | PG8 | EQ8' | EQ7' | EQ6' | EQ5' | EQ4' | EQ3' | EQ2' | EQ1' | PP | A1 | A2 |

Although various embodiments have been shown and described, the present disclosure is not so limited and will be understood to include all such modification and variations as would be apparent to one skilled in the art.

What is claimed is:

1. A cyclic pressure swing adsorption (PSA) process for the substantial removal of $H_2O$ and $CO_2$ comprising: contacting a multicomponent feed gas at elevated pressure with an adsorbent bed comprising a layer of activated alumina and a layer of alkali-promoted alumina to obtain a multicomponent product gas substantially free of $H_2O$ and $CO_2$ with high recovery of the product gas components, the process wherein a plurality of adsorbent beds in a PSA system are subjected to a series of process steps which include an adsorption step, three or more pressure equalization steps at decreasing pressure, a blowdown step, a purge step in which the purge gas comprises a portion of the product gas or a gas originating externally from the process that is substantially free of $H_2O$ and $CO_2$ and comprises at least one of the major components of the product gas, three or more pressure equalization steps at increasing pressure, and a final repressurization step, wherein each of the adsorbent beds contains at least one adsorbent layer for the substantial removal of $CO_2$ characterized by:
   i. a $CO_2$ loading capacity of greater than or equal to 0.1 mol $CO_2$ per kg of adsorbent at a $CO_2$ partial pressure of 1000 Pa at 300 K, and
   ii. a differential capacity of the product gas components of less than or equal to 0.1 mol per kg of adsorbent, where the differential capacity is defined as the difference between the loading capacity at partial pressures of 100,000 Pa and 10,000 Pa at 300 K.

2. The cyclic PSA process of claim 1, wherein the $H_2O$ concentration in the multicomponent product gas is less than or equal to 10 ppb, and $CO_2$ is typically removed to below 100 ppb.

3. The cyclic PSA process of claim 1, wherein the adsorbent bed comprises a layer of activated alumina, a layer of silica gel, and a layer of alkali-promoted alumina.

4. The cyclic PSA process of claim 1, wherein a number of successive countercurrent depressurization steps is greater than or equal to 4.

5. The cyclic PSA process of claim 1, wherein a number of successive countercurrent depressurization steps is greater than or equal to 5.

6. The cyclic PSA process of claim 1, wherein a number of adsorbent beds simultaneously processing feed gas is 2.

7. The cyclic PSA process of claim 1, wherein a number of adsorbent beds simultaneously processing feed gas is 3.

8. The cyclic PSA process of claim 1, wherein the feed gas is a synthesis gas comprising at least $H_2$, CO, $CH_4$, $CO_2$, and $H_2O$ with a high recovery of $H_2$ and CO.

9. The cyclic PSA process of claim 1, wherein the feed gas is a natural gas comprising at least $CH_4$, $N_2$, $CO_2$, and $H_2O$ with a high recovery of CH4 and N2.

10. The cyclic PSA process of claim 1, wherein the purge gas is provided from a cryogenic separation unit or a H2 PSA or a membrane unit.

11. The cyclic PSA process of claim 5, wherein a synthesis gas is produced via steam methane reforming, autothermal reforming, or partial oxidation.

12. The cyclic PSA process of claim 10, where in the purge gas is a tail gas from a $H_2$ PSA or a membrane unit.

13. The cyclic PSA process of claim 10, where in the purge gas is a flash gas or crude $H_2$ gas from a cryogenic separation unit.

14. The cyclic PSA process of claim 2, wherein the $H_2O$ concentration in the multicomponent product gas is less than 1 ppb.

15. The cyclic PSA process of claim 2, wherein the $CO_2$ concentration in the multicomponent product gas is typically removed to less than 25 ppb.

* * * * *